(12) United States Patent
Xu et al.

(10) Patent No.: US 11,189,382 B2
(45) Date of Patent: Nov. 30, 2021

(54) INTERNET OF THINGS (IOT) HYBRID ALERT AND ACTION EVALUATION

(71) Applicant: VMware, Inc., Palo Alto, CA (US)

(72) Inventors: Hui Xu, Palo Alto, CA (US); Niranjan Maka, Palo Alto, CA (US); Gregory Bollella, Palo Alto, CA (US); Karen Brems, Redwood City, CA (US)

(73) Assignee: VMWARE, INC., Palo Alto, CA (US)

( * ) Notice: Subject to any disclaimer, the term of this patent is extended or adjusted under 35 U.S.C. 154(b) by 56 days.

(21) Appl. No.: 16/732,698

(22) Filed: Jan. 2, 2020

(65) Prior Publication Data
US 2021/0210217 A1   Jul. 8, 2021

(51) Int. Cl.
*G16Y 40/50* (2020.01)
*G16Y 40/35* (2020.01)
*G16Y 20/20* (2020.01)

(52) U.S. Cl.
CPC .............. *G16Y 40/50* (2020.01); *G16Y 20/20* (2020.01); *G16Y 40/35* (2020.01)

(58) Field of Classification Search
CPC ......... G16Y 40/50; G16Y 20/20; G16Y 40/35
See application file for complete search history.

(56) References Cited

U.S. PATENT DOCUMENTS

| | | | |
|---|---|---|---|
| 2008/0154806 A1* | 6/2008 | Morris | H04N 5/4403 706/12 |
| 2012/0271809 A1* | 10/2012 | Lyon | G06F 16/951 707/706 |
| 2012/0272314 A1* | 10/2012 | Lyon | H04L 63/1416 726/22 |
| 2013/0079145 A1* | 3/2013 | Lam | A63F 13/355 463/42 |
| 2016/0105814 A1* | 4/2016 | Hurst | H04L 67/10 370/252 |
| 2018/0341254 A1* | 11/2018 | Ovens | G06F 11/0733 |

* cited by examiner

*Primary Examiner* — Arvin Eskandarnia
(74) *Attorney, Agent, or Firm* — Thomas | Horstemeyer, LLP

(57) ABSTRACT

Various examples are disclosed for hybrid alert and action solution in internet-of-things (IoT) networks. A computing environment can generate an alert and an action to perform when criteria associated with the alert is satisfied based at least in part on data collected from at least one of a plurality of sensor devices. The computing environment can determine whether the alert and the action is capable of being evaluated and performed on an edge computing device in communication with the at least one of the plurality of sensor devices based at least in part on a computing capability of the edge computing device or the at least one server computing device. The computing environment can assign the alert criteria and the action to the edge computing device or the at least one server computing device.

20 Claims, 8 Drawing Sheets

US 11,189,382 B2

INTERNET OF THINGS (IOT) HYBRID ALERT AND ACTION EVALUATION

BACKGROUND

The internet-of-things (IoT) refers to interrelated computing devices, sensors, and objects that are network-enabled such that they are periodically able to transfer data over a network. Most internet-of-things architectures include three architectural layers, including a sensor layer, an edge system layer (also referred to as a "gateway layer"), and a server layer that may execute in a cloud or on-premise computing environment. Notably, many internet-of-things solutions evaluate data collected from end devices at a server, where alerts are triggered and actions are taken based on the data received from sensor devices.

There are many disadvantages for evaluating data, performing event evaluation, and triggering alerts at the server. For instance, high and unpredictable latency may occur when evaluating data at the server. Additionally, network bandwidth demand is increased as all data and corresponding events, actions, and related data must be transmitted over a network.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
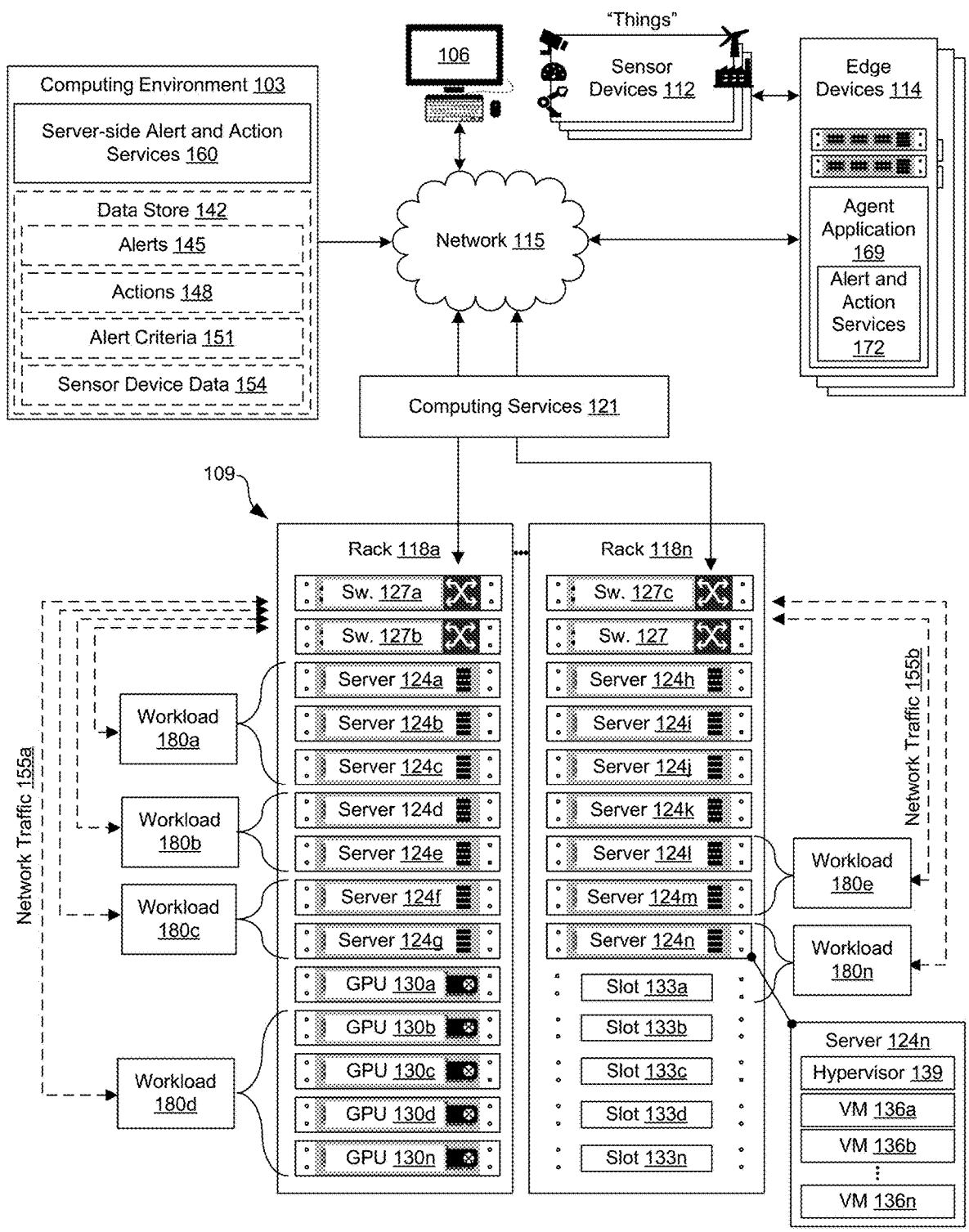
FIG. 1 is a drawing of an example of a networked computing environment for internet-of-things hybrid alert and action evaluation.

The present disclosure relates to internet-of-things hybrid alert and action evaluation. In internet-of-things networks, various disadvantages exist when evaluating data, triggering alerts, and performing alert analysis at a server. For instance, sensor devices must communicate data periodically to an edge device which, in turn, must send the data to a server where data is evaluated, and alerts are analyzed. As some networks include tens of thousands to millions of sensor devices, high and unpredictable latency often occurs when evaluating data at the server. Additionally, the demand for network bandwidth is substantially increased due to data and corresponding events, actions, and related data being repeatedly transmitted over a network. Performing data and alert evaluation on an edge device can vastly reduce network latency. However, computing resources of edge devices are very limited, and server side evaluation and analysis is still needed.

Internet-of-things technologies attempt to place all "things", or devices, on a network, thereby permitting users to remotely monitor, manage, and/or control the devices. A traditional three-tier internet-of-things architecture includes sensor devices, edge devices (also referred to as gateway devices), and one or more servers that can operate in a cloud computing environment or an on-premises environment. An agent application on the edge devices can interact with sensor devices to collect data for transmission to servers for analysis or storage, or send files and commands to the sensor devices. In some examples, servers provide an administrator console having one or more user interfaces for managing devices in their life cycle; analyzing, storing, and displaying sensor data in real time; creating alerts with customized criteria on data received from sensor devices; and carrying out over-the-air (OTA) operations on sensor devices.

With the advent of internet-of-things, users can automate device operations, for example, through creation of alerts and actions. For instance, users can define alerts that are automatically generated based on device metrics, thresholds, and other criteria. In one example, for a device having a temperature sensor, a user can generate an alert that is sent when a measured temperature is greater than or equal to 90 degrees. Further, the user can define an action to be performed automatically when criteria associated with an alert is satisfied. An alert service can evaluate data received from sensor devices based on definitions specified by users, and trigger or cancel alerts. When an alert is triggered, users or computing services can be automatically notified using at least one predefined communication methods, such as email, HTTP request, etc.

Traditionally, when alerts indicate a state of a sensor device is non-operational, administrators investigate, fix identified issues, and revert the sensor device to normal operational state. However, advanced data analysis technologies, such as machine and deep learning, can be carried out to diagnose issues with sensor devices, determine solutions, and automate an action to be performed to resolve the issues.

Traditionally, to perform robust computing calculations, significant computing abilities and resources are required. Alert and action services require quick response times. For instance, low latency is required when an alert is triggered to carry out an action to return a sensor device to normal operational state. In addition, network bandwidth may be a limiting resource substantially inhibiting wide-scale deployment of internet-of-things technology. Disadvantages of evaluating data points and making decision for actions on a server include high and unpredictable latency and network bandwidth demand.

Evaluating data, analyzing alerts, and performing actions on an edge device can reduce latency and increase response-time predictability. In addition, not all criteria and other data for alerting are required to be stored on a server. If data evaluation, alert analysis, and action performance are accomplished at the edge device, filtering and aggregation can be performed to send only necessary data to servers in less frequent batches, vastly reducing the number of data streams and bandwidth usage. However, this may not be possible when storage or computing ability are insufficient on various types of edge devices, or when the data evaluation criteria or analysis are complicated. For instance, edge devices are not ideal for performing alert definitions in cross edge systems, calculating advanced statistics, or executing artificial intelligence (AI) routines. In these cases, the use of a server can be beneficial.

Therefore, a hybrid solution for alert and action service is described herein. An alert and action service can serve up an administrator console having one or more interfaces to create, read, update, or delete (CRUD) alert definitions and actions. A data point evaluator (DPE) is described that evaluates data and triggers alerts. A user interface can be accessed to read or acknowledge alerts. In the various examples described herein, various components can be deployed on a server; however, a portion of the components may also be deployed on an edge device, such as the data evaluator and alert analysis and action decision making (ADM) service.

More specifically, in some examples, only edge devices that satisfy a resource requirement or a computing capability will deploy alert service components, such as the DPE and the ADM. When users define alert definitions through the administrator console, the service side alert definition component based on the information of registered edge systems can determine whether alert definition related devices are relevant with an edge system, whether a service executing on the edge device is available, and whether alert evaluation and analysis can be carried out on the edge device. Based on the foregoing, the alert task can be created and registered on an edge device or remote servers. Then, an agent application on an edge device can direct corresponding real time device metric data streams to one or more devices where an alert definition is registered. When an alert is triggered at an edge device, a local decision making service can investigate and trigger an action directly through a local agent application to alleviate or resolve the issue. When an alert is triggered at the server, an action determined on the service side can require being sent to an agent application on a remotely located device. In addition, the agent application can buffer, aggregate, and filter data which is not necessary to be sent to a server in real time. For instance, only metric data can be sent which will only be evaluated by edge side evaluator, alerts, actions and so on.

The examples described herein provide lower latency and a lower demand in bandwidth through the processing of complicated alert tasks and through sophisticated action decisions performed on various devices in an internet-of-things network.

Turning now to FIG. 1, an example of a networked environment 100 is shown. The networked environment 100 can include a computing environment 103, client devices 106, various computing systems 109, and internet-of-things devices having one or more sensors (hereinafter "sensor devices 112"), and edge devices 114 in communication with one other over a network 115. The network 115 can include, for example, the Internet, intranets, extranets, wide area networks (WANs), local area networks (LANs), wired networks, wireless networks, other suitable networks, or any combination of two or more such networks.

The network 115 of the networked environment 100 can include satellite networks, cable networks, Ethernet networks, telephony networks, and other types of networks. The computing systems 109 can include devices installed in racks 118a . . . 118n (collectively "racks 118"), which can make up a server bank, aggregate computing system, or a computer bank in a data center or other like facility. In some examples, the computing systems 109 can include high-availability computing systems, which includes a group of computing devices that acts as a single system and provides a continuous uptime. The devices in the computing systems 109 can include any number of physical machines, virtual machines, virtual appliances, and software associated therewith, such as operating systems, drivers, hypervisors, scripts, and applications.

The computing systems 109, and the various hardware and software components contained therein, can include infrastructure of the networked environment 100 that provide one or more computing services 121. Computing services 121 can include alert services or other application programming interface (API) services. For instance, the computing services 121 can provide an applicant programming interface that permits an application or service to generate, store, retrieve, delete or otherwise interact with alerts. The alerts may be stored in a data store that can include memory accessible by one or more of a plurality of servers 124a . . . 124n (collectively "servers 124"). For instance, the data store can include one or more relational databases, such as structured query language databases, non-SQL databases, time-series databases, or other relational or non-relational databases.

The computing environment 103 can include an enterprise computing environment that includes hundreds or even thousands of physical machines, virtual machines, and other software implemented in devices stored in racks 118, distributed geographically, and connected to one another through the network 115. As such, the computing environment 103 can be referred to as a distributed computing environment in some examples. It is understood that any virtual machine or virtual appliance is implemented using at least one physical device, such as a server or other computing device.

The devices in the racks 118 can include various physical computing resources. The physical computing resources can include, for example, physical computing hardware, such as memory and storage devices, servers 124, switches 127a . . . 127n, graphics cards having one or more GPUs 130a . . . 130n installed thereon, central processing units (CPUs), power supplies, and similar devices. The devices, such as servers 124 and switches 127, can have dimensions suitable for quick installation in slots 133a . . . 133n on the racks 118.

In various examples, the servers 124 can include requisite physical hardware and software to create and manage virtualization infrastructure, a cloud computing environment, an on-premise environment, and/or a serverless computing environment. Also, in some examples, the physical computing resources can be used to provide virtual computing resources, such as virtual machines or other software, as a computing service 121.

Each server 124, such as representative server 124n, can act as a host in the networked environment 100, and thereby can include one or more virtual machines (VMs) 136a . . . 136n (collectively "virtual machines 136"). In some examples, a hypervisor 139 can be installed on a server 124 to support a virtual machine execution space within which one or more virtual machines 136 can be concurrently instantiated and executed. The hypervisor 139 can include the ESX™ hypervisor by VMware®, the ESXi™ hypervisor by VMware®, or similar hypervisor 139 in some examples. It is understood that the computing systems 109 can be scalable, meaning that the computing systems 109 in the networked environment 100 can increase or decrease dynamically to include or remove servers 124, switches 127, GPUs 130, power sources, and other components without downtime or otherwise impairing performance of the computing services 121 offered up by the computing systems 109.

Referring now to the computing environment 103, the computing environment 103 can include, for example, a server 124 or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. Although shown separately from the computing systems 109, it is understood that in some examples the computing environment 103 can be included as all of or a part of the computing systems 109.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 109 and client devices 106 over the network 115, sometimes remotely, the computing environment 103 can be described as a remote computing environment 103 in some examples. Additionally, in various examples, the computing environment 103 can be implemented in servers 124 of a rack 118, and can manage operations of a virtualized or cloud computing environment through interaction with the computing services 121.

The computing environment 103 can include a data store 142, which can include one or more databases in some examples. The data store 142 can include memory of the computing environment 103, mass storage resources of the computing environment 103, or any other storage resources on which data can be stored by the computing environment 103. The data store 142 can include memory of the servers 124 in some examples. The data store 142 can include one or more relational databases, such as structured query language databases, non-SQL databases, or other relational or non-relational databases. The data stored in the data store 142, for example, can be associated with the operation of the various services or functional entities described below.

The data store 142 can include alerts 145, actions 148, alert criteria 151, sensor device data 154, as well as other data. The alerts 145 can include predefined tasks that are performed in response to alert criteria 151 being satisfied. For instance, if a sensor device 112 includes a camera, a user can create an alert criteria 151 having a corresponding predefined action 148 that notifies security personnel when the camera becomes non-operational or when motion has been detected.

The components executed on the computing environment 103 can include, for example, server-side alert and action services 160, as well as other applications, services, processes, systems, engines, or functionality not discussed in detail herein. The server-side alert and action service 160 can provide an administrator console having one or more interfaces to create, read, update, or delete alert criteria 151 and associated actions 148. In some examples, the server-side alert and action service 160 includes a data point evaluator that evaluates sensor data and triggers alerts 145 if alert criteria 151 is satisfied. Further, the server-side alert and action service 160 can serve up one or more user interfaces that can be accessed by the client device 106 to read or acknowledge alerts 145. In the various examples described herein, various components can be deployed on a server; however, a portion of the components may also be deployed on an edge device 114, such as the alert analysis and action decision making (ADM) service and the data point evaluator.

The sensor devices 112 can include "things" in an internet-of-things networks, such as objects or devices having one or more sensors thereon, such as a camera, temperature sensor, humidity sensor, microphone or audio sensor, presence sensor, or other sensor. To this end, the sensor devices 112 can include touch sensors; cameras; automotive sensors, such as fuel sensors, temperature sensors, engine sensors, and tire sensors; manufacturing sensors, such as assembly line sensors; and industrial sensors, such as windmill and solar panel sensors.

In some examples, sensor devices 112 do not include a wide area network interface, but can include hardware to communicate data measured by the one or more sensors to an edge device 114 located at or near the sensor devices 112. For instance, sensor devices 112 can communicate data through Bluetooth®, Zigbee®, or other suitable medium to edge devices 114. The edge devices 114, in turn, can route the data to the computing environment 103 and other servers 124. As such, the edge devices 114 are often referred to as gateways as they include a networking module that permits remote communication over the Internet or other suitable network 115.

In some examples, an edge device 114 can include an agent application 169 that oversees operation of the edge device 114 as well as sensor devices 112 to which the edge device 114 is paired or assigned. For instance, assuming a sensor device 112 includes a smart lock that secures a door to a home or business using a keypad that requires entry of a predefined sequence of numbers to open. The sensor device 112 may not have the capability of communicating data over the network 115, for instance, to a server 124. As such, the sensor device 112 can collect successful or unsuccessful attempts to open the smart lock to the edge device 114, and send the data associated therewith to an edge device 114. The edge device 114 acts as a proxy that routes the data to a server 124. Through a client device 106 interacting with a server 124, an owner of the smart lock can view the successful or unsuccessful attempts to open the smart lock.

In some examples, depending on computing capabilities of edge device 114, the agent application 169 can include alert and action services 172, similar to the server-side alert and action services 160. However, the alert and action services 172 on the edge device 114 can evaluate data received from the sensor devices 112 and alerts 145 locally on the edge device 114 without having to communicate data over the network 115, thereby reducing network bandwidth and latency.

Ultimately, the various physical and virtual components of the computing systems 109 can process workloads 180a . . . 180n. Workloads 180 can refer to the amount of processing that a server 124, switch 127, GPU 130, or other physical or virtual component has been instructed to process or route at a given time. The workloads 180 can be associated with virtual machines 136, public cloud services, private cloud services, hybrid cloud services, virtualization services, device management services, containers, or other software executing on the servers 124.

Figure 2:
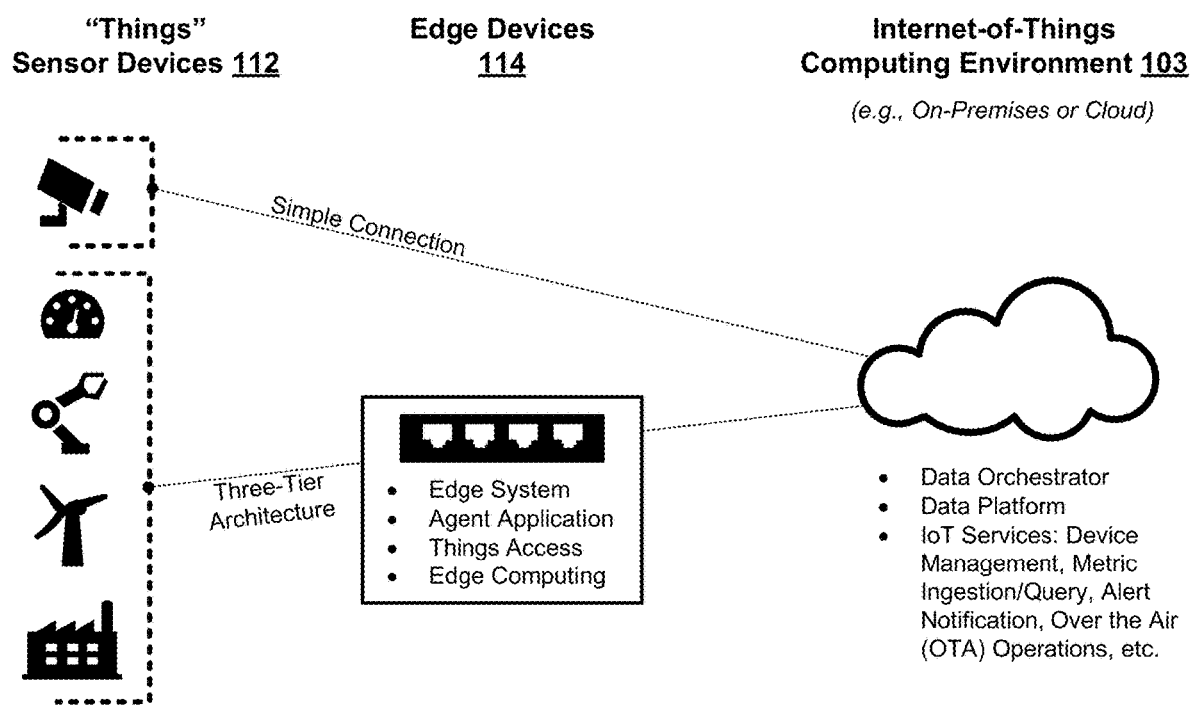
FIG. 2 is a schematic diagram illustrating a three-tier internet-of-things computer architecture.

Referring now to FIG. 2, a schematic diagram of a three-tier internet-of-things computer architecture is shown. The first tier includes sensor devices 112, which can include cameras; automotive sensors, such as fuel sensors, temperature sensors, engine sensors, and tire sensors; manufacturing sensors, such as assembly line sensors; and industrial sensors, such as windmill and solar sensors. The second tier includes edge devices 114. The agent applications 169 on the edge device 114 can communicate with both sensor devices 112 and the computing environment 103. The computing environment 103 can provide users with various services and interfaces that manage and monitor sensor devices 112 and edge devices 114, manage identities and access for users and devices 112, 114, create and customize alert criteria 151, notify users, carry out actions through over-the-air operations on sensor devices 112, and other actions.

Figure 3:
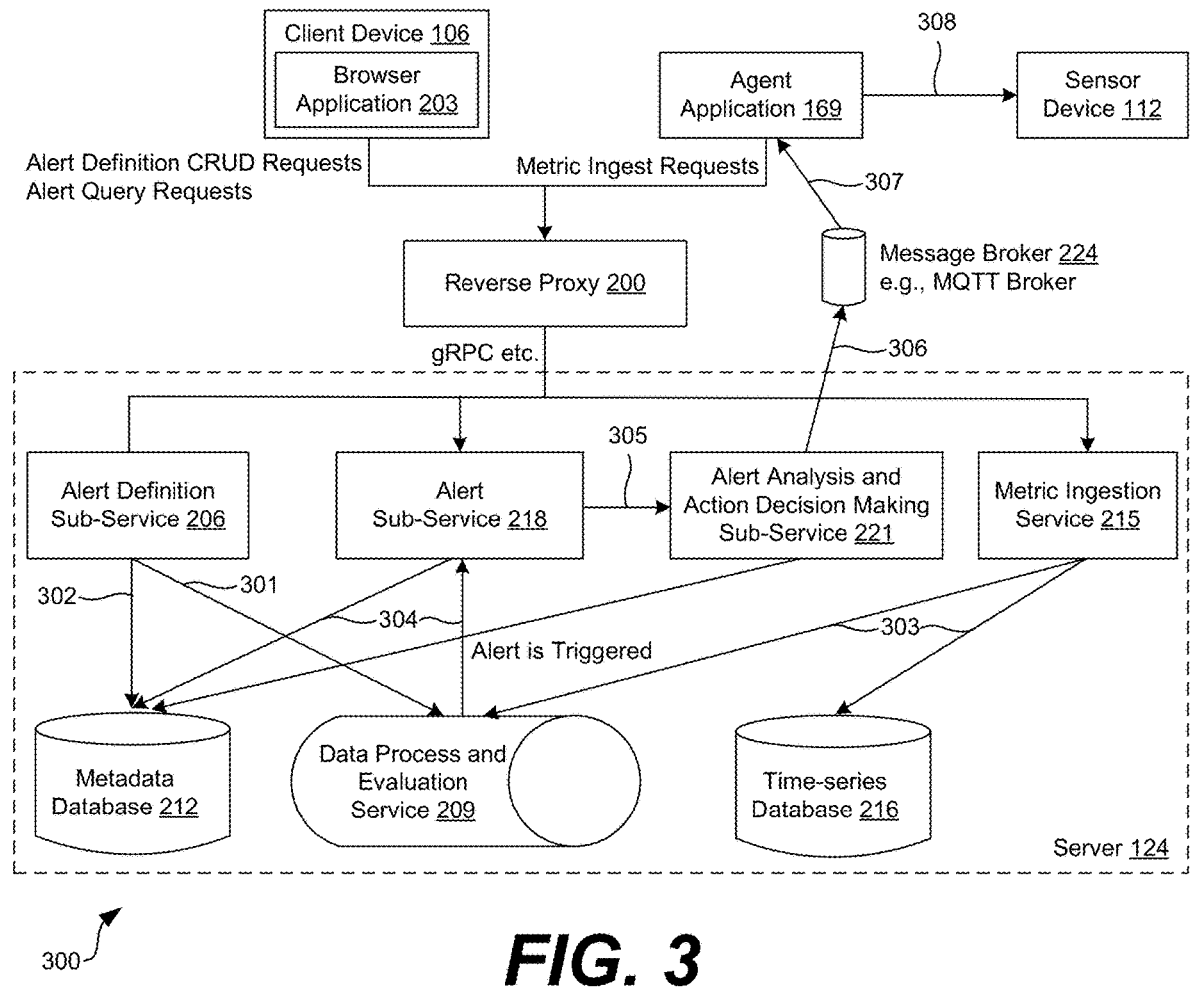
FIGS. 3 and 4 are schematic diagrams illustrating example computer architectures for internet-of-things alert and action evaluation.

Turning now to FIG. 3, a schematic diagram 300 is shown that illustrates an example of a traditional alert-and-action service architecture, where an alert service only resides in the server 124, for instance, behind a reverse proxy 200. As shown in FIG. 3, the workflow includes various steps. At step 301, a user defines an alert criteria 151 through a request made through a browser application 203 of a client device 106 or other suitable client application. The request to define an alert criteria 151 is directed to an alert definition sub-service (ADSS) 206. The alert definition sub-service 206 can first send a request to a data process and evaluation service 209 for creating tasks for evaluating data received from sensor devices 112.

In step 302, once an alert criteria 151 is successfully registered, the alert definition sub-service 206 can save the alert criteria 151 in a metadata database (MDB) 212 or other suitable data store 142. In step 303, the agent application 169 can collect and send metric values to a metric ingestion (MI) service 215. The metric ingestion service 215 can ingest metrics and other data received from the sensor devices 112, store the data in a time-series database 216, and send the data to the data process and evaluation service 209.

Next, in step 304, when alert criteria 151 is met and an alert 145 is triggered, an alert sub-service (ASS) 218 can store a record of the alert 145 in the metadata database 212 or other suitable data store 142. In step 305, the alert sub-service 218 can send information associated with the alert 145 to an action decision making sub-service (ADMSS) 221 to determine actions 148, if any, that should be carried out. In some examples, the actions 148 include remedial actions that return a sensor device 112 to a normal operational state.

In step 306, the action decision making sub-service 221 can send a request for an action 148 back to the agent application 169. Notably, in some examples, the request can be sent through one or more communication mechanisms, such as a message broker 224. The message broker 224 can include an MQ Telemetry Transport (MQTT) broker in some examples. As such, the action decision making sub-service 221 can publish a request to the message broker 224.

Thereafter, in step 307, the agent application 169 of the edge device 114 can receive the request by subscribing to a corresponding channel from the message broker 224. In step 308, the agent application 169 can then pass the action 148, such as a command to the sensor device 112, to a corresponding sensor device 112 to be carried out. A command can include a remedial action, such as rebooting, restoring software to a prior version, toggling a hardware component, installing a version of firmware, or other suitable remedial action.

Notably, a problem with the architecture shown in FIG. 3 includes a delay between a triggering of an alert 145 and an action 148 being performed is greatly increased because of a round trip transmission among the agent application 169 and a server 124. Another critical disadvantage includes the data being transferred to servers 124 located remotely from the edge device 114, and actions 148 must be transferred back to the agent application 169 on edge device 114. That is, for alert-relevant metrics, no data filtering can be carried out. Additionally, alert and action data cannot be buffered and aggregated and sent in bulks to decrease network bandwidth. As can be estimated, the inability to filter or send bulk data causes high bandwidth and, as a result, network bandwidth will be a primary limiting resource inhibiting wide-scale deployment of internet-of-things technology.

To reduce the delay, data received from sensor devices 112 can be evaluated and corresponding decisions to take actions 148 can be performed on the edge device 114. In addition, data corresponding to alerts 145 that can be performed on an edge device 114 is not necessary to be stored on a server 124. If an alert 145 and an action 148 are performed on the edge device 114, data filtering and aggregation can be carried out locally on the edge device 114 to send only necessary data back to the servers 124 in batches, vastly reducing usage of network bandwidth.

Figure 4:
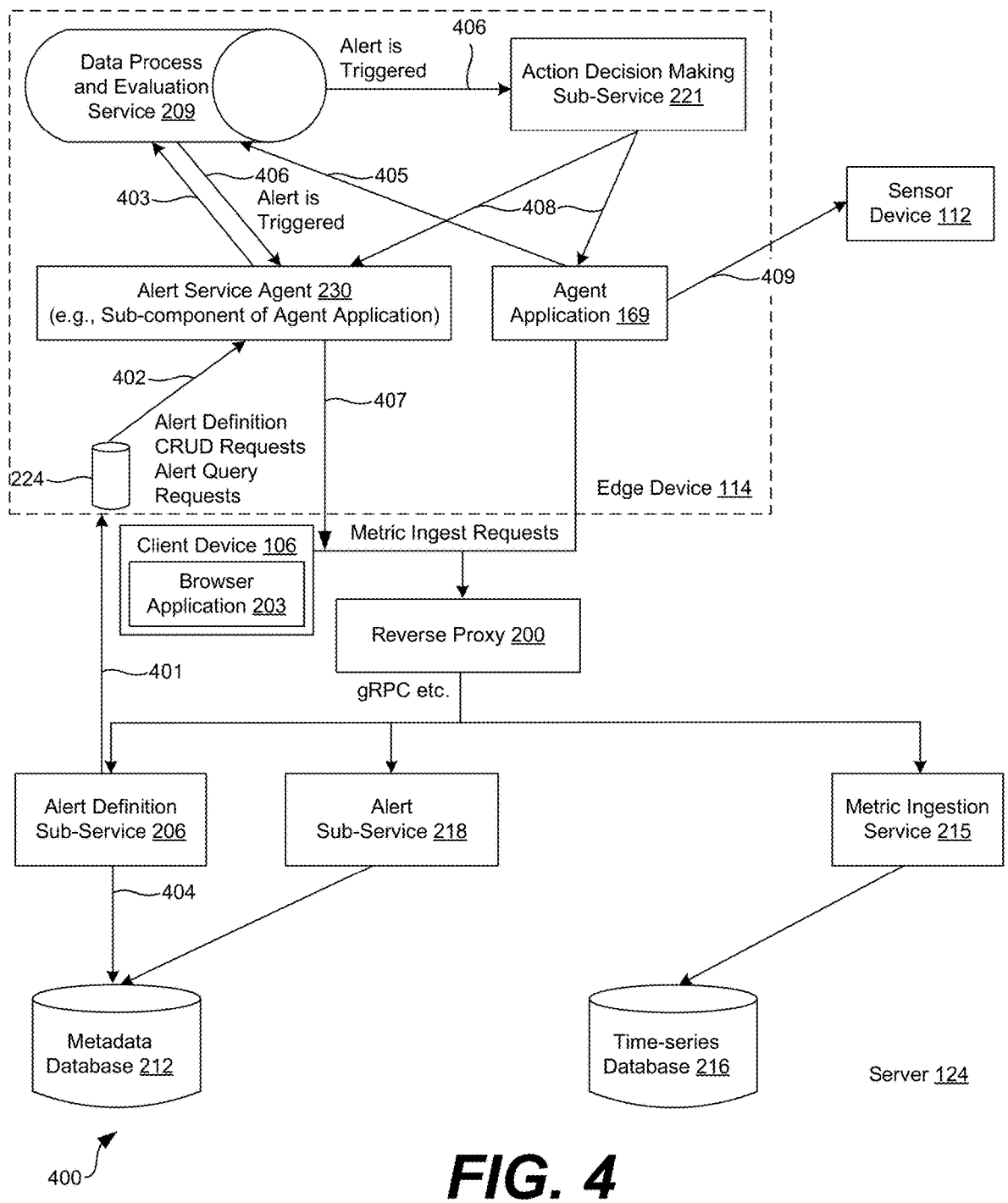

Referring now to FIG. 4, a schematic diagram 400 is shown that illustrates an example of an alert evaluator and an action decision making sub-service 221 executed locally on an edge device 114. First, at step 401, when a request to create an alert criteria 151 is received by the alert definition sub-service 206, the alert definition sub-service 206 can publish the request to the message broker 224.

At step 402, a sub-component of the agent application 169, such as an alert service agent (ASA) 230 can receive the request, for instance, by subscribing to a corresponding channel from the message broker 224. At step 403, the alert service agent 230 can pass the request to the data process and evaluation service 209 for creating a task for evaluating data received from the sensor device 112.

Next, at step 404, once the task is successfully registered, the alert definition sub-service 206 can save the definition of the alert criteria 151 into the metadata database 212. At step 405, the agent application 169 on the edge device 114 can collect and send metric values or other data received from the sensor device 112 to the data process and evaluation service 209.

At steps 406 and 407, when alert criteria 151 has been met, an alert 145 is triggered which is directed to the alert service agent 230 and, thereafter, to the alert sub-service 218 through a reverse proxy 200 for storage in the metadata database 212.

Meanwhile, at steps 406 and 408, the alert 145 can also be sent to the action decision making sub-service 221 to determine what actions 148 should be carried out. In some examples, the actions 148 can include returning a sensor device 112 to a normal operational state. Once the action 148 is determined, the action 148 is directed to the alert service agent 230 and the alert sub-service 218 to store the action record into the metadata database 212. In some examples, storage of the data in the metadata database 212 is performed through a reverse proxy 200. In steps 408 and 409, the action 148 is also sent to the agent application 169 on the edge device 114. Thereafter, the action 148 is directed to or performed by the agent application 169 on corresponding sensor devices 112.

With respect to the time interval from when the data is sent from the agent application 169 to when it arrives at the data process and evaluation service 209, in the edge-side solution of FIG. 4, only one local transmission is required, whereas, in the server-side solution of FIG. 3, three transmissions and two processing tasks are required. Specifically, the three transmissions and two processing tasks include one remote transmission from the agent application 169 of the edge device 114 to the server 124 through reverse proxy 200, two server 124 transmissions from the reverse proxy 200 to the metric ingestion service 215 and to the data process and evaluation service 209, and two processing tasks performed by the reverse proxy 200 and the metric ingestion service 215.

As for the time interval from when the request for the action 148 is sent from the action decision making sub-service 221 to when it arrives at the agent application 169, in the edge-side solution of FIG. 4, only one local transmission is required whereas, in the server-side solution of FIG. 3, two transmissions and one processing task are required, namely, two transmissions from the action decision making sub-service 221 to the message broker 224, then from the message broker 224 to the agent application 169, and one processing task performed at the message broker 224. As such, it can be observed that the edge-side latency is substantially less than that the server-side latency by around three transmissions and three processing times.

However, relying solely on alert processing performed on an edge device 114 may not be possible when the edge system storage or computing ability is not substantial enough to support processing each alert 145 or action 148, or when the data evaluation criteria or data analysis are complicated. For instance, edge devices 114 can have insufficient computing resources when a definition of an alert criteria 151 requires data from multiple edge devices 114 (such as CPU>Average (CPU) for all gateways in a last hour), based on complex statistics, or utilize artificial intelligence routines. In this case, evaluation of data points and alerts 145 on the computing environment 103, instead of the edge device 114, is beneficial.

Figure 5:
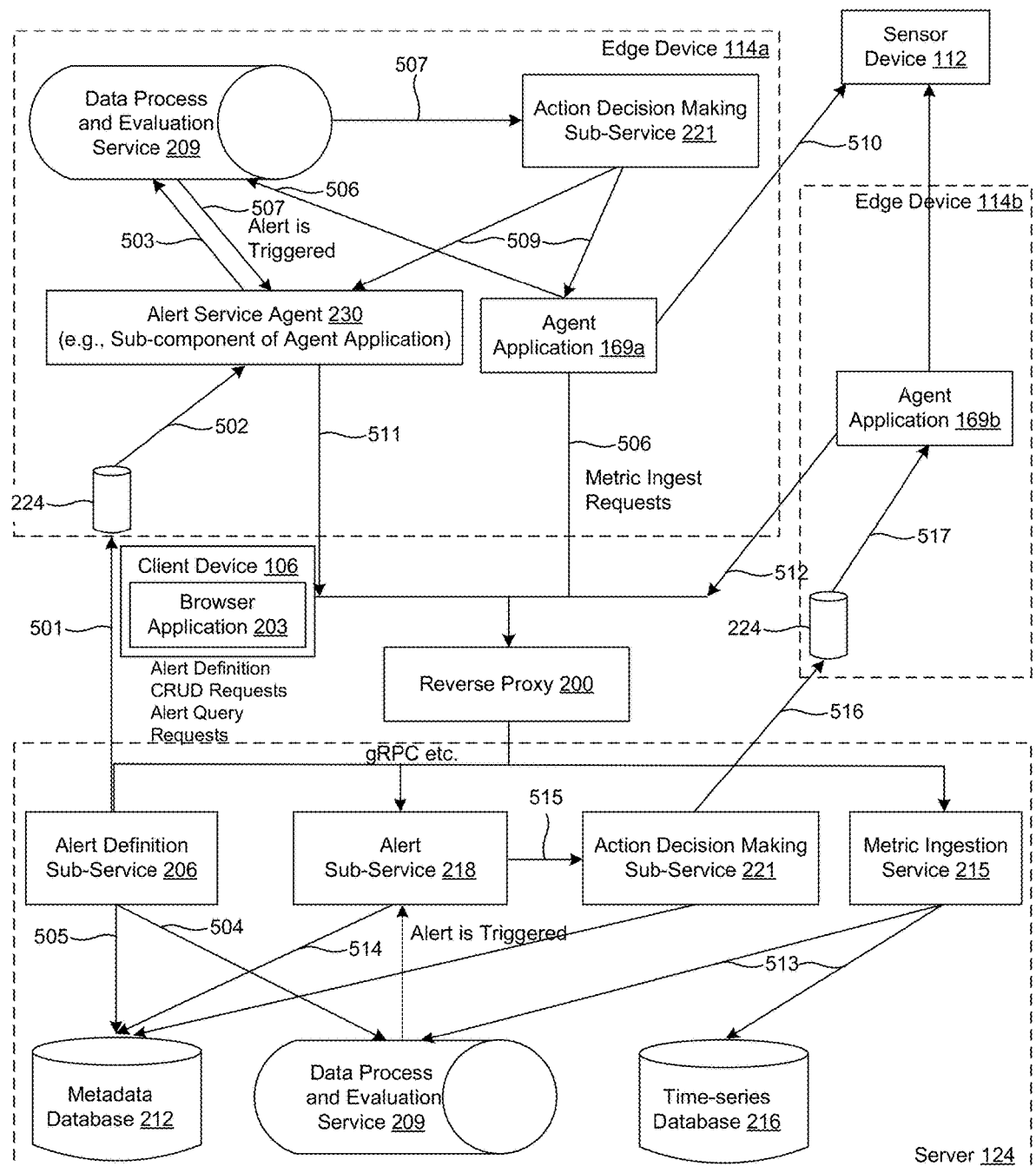
FIG. 5 is a schematic diagram illustrating an example computer architecture for internet-of-things hybrid alert and action evaluation.

According to various examples described herein, a hybrid solution for an alert and action service is described that performs various tasks on each of the edge devices 114 and a server 124, such as the computing environment 103. FIG. 5 shows a schematic diagram 500 of an example of a hybrid alert and action service architecture. In FIG. 5, a first type of edge device 114a and a second type of edge device 114b are shown, where the first type of edge device 114a includes alert and action services and the second type of edge device 114b without alert and action services. For instance, the second type of edge device 114b does not include the data process and evaluation service 209, the action decision making sub-service 221, the alert service agent 230, as well as other services.

It is understood that the second type of edge device 114b is without the alert and action services due to the hardware and/or software capabilities of the second type of edge device 114b. For instance, the second type of edge device 114b can have insufficient central processing unit (CPU) resources, RAM or hard disk resources, the ability to install the alert and actions services on the edge device 114b, an incompatibility of the alert and action services on the edge device 114b, or other incompatibility.

Users can define alert criteria 151 for particular edge devices 114, or on a certain type of edge device 114, such as all edge devices 114 having a same manufacturer and/or model number. Assuming the edge devices 114 have enrolled with the computing environment 103, the computing environment 103 can have a device profile corresponding to each of the edge devices 114. The device profile can include hardware specifications, software specifications, and other information pertaining to the edge devices 114 beneficial in determining whether an edge device 114 is capable of evaluating alerts 145 and performing actions 148 locally or, in other words, without use of resources of the computing environment 103. In some examples, the device profile describes a current state of the edge device 114, and can include current configurations, settings, applications installed thereon, and other information. As such, the alert definition sub-service 206 can utilize devices profiles of edge devices 114 to determine whether an alert definition task is to be registered on the edge device 114 or, alternatively, is to be registered on the server 124.

With respect to FIG. 5, the definition of an alert criteria 151 is as follows. First, at step 501, when a request to create an alert criteria 151 is received by a server 124, the alert definition sub-service 206 can first determine whether the alert criteria 151 is edge-allowable or not. For instance, the alert definition sub-service 206 can determine whether an edge device 114 is capable of processing alert criteria 151 based on the hardware specifications, software specifications, or other specifications of the edge device 114. Additionally, the alert definition sub-service 206 can determine whether the alert criteria 151 utilizes data collected from multiple edge devices 114, which is not ideal to be performed in a single edge device 114 and is instead better handled at a server 124. Similarly, if the alert analysis and action decision making utilize advanced statistics or artificial routines, the alert definition sub-service 206 can determine that the evaluation of the alert 145 should be handled by a server 124.

If an alert criteria 151 associated with an edge device 114 is "edge-allowable" or, in other words, is capable of being processed on the edge device 114, the alert criteria 151 can be registered on the relevant edge device 114. Notably, in some examples, an alert criteria 151 may need to be sent to multiple relevant edge devices 114, for instance, in the case where the alert criteria 151 spans many edge devices 114 of a specific type. If the alert criteria 151 is edge-allowable, the alert definition sub-service 206 can further determine whether relevant edge devices 114 have an alert service installed thereon or not. If the edge devices 114 have an alert service, the alert definition sub-service 206 can publish the request to create an alert criteria 151 to the message broker 224.

In steps 502 and 503, the alert service agent 230 on each of the edge devices 114 can register the alert criteria 151 in the data process and evaluation service 209. In step 504, if relevant edge devices 114 do not have an alert service installed thereon, or are otherwise incompatible with the alert criteria 151, the alert definition sub-service 206 can pass the request for the alert criteria 151 to the data process and evaluation service 209 on a server 124 for registering the alert criteria 151 for remote processing. In step 505, once the definition of the alert criteria 151 is successfully registered, the alert definition sub-service 206 will save a corresponding record into the metadata database 212.

The triggering of an alert 145 and performance of an action 148 are now described. For instance, in steps 506 to 511, an edge-side alert and action procedure is performed as previously described with respect to FIG. 4. In steps 512 to 517, a server-side alert and action procedure is performed as previously described with respect to FIG. 3. The hybrid alert and action solution provides lower latency when performing alerts and quick actions, and is capable of processing complicated alerts 145 and making sophisticated action 148 decisions.

Figure 6:
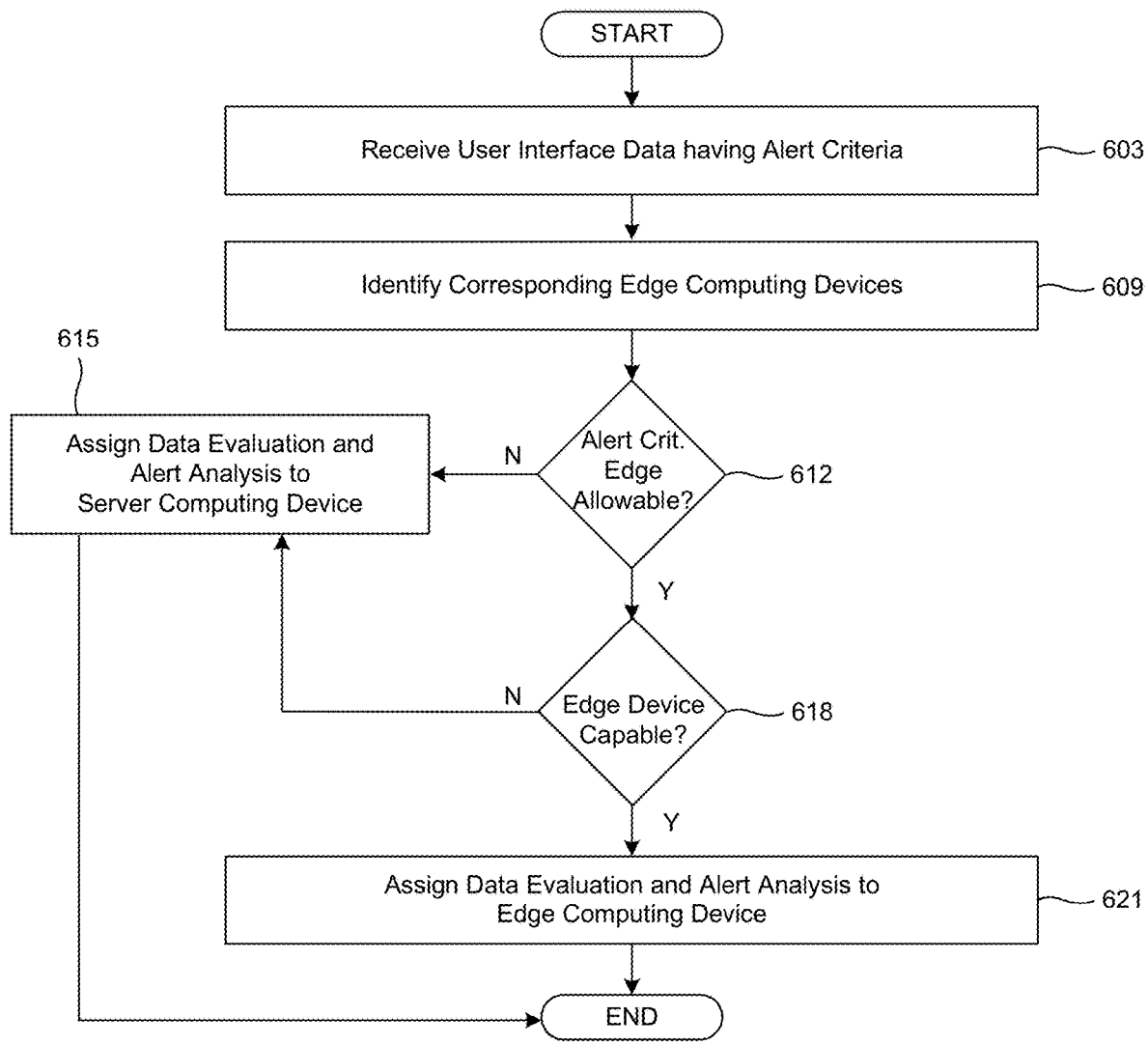
FIG. 6 is a flowchart illustrating functionality implemented by components of the networked computing environment of FIG. 1 in performing hybrid alert and action evaluation.

Moving on to FIG. 6, a flowchart is shown that provides one example of the operation of a portion of the networked environment 100. The flowchart of FIG. 6 can be viewed as depicting an example of elements of a method implemented by the server-side alert and action services 160 executing in the computing environment 103 according to one or more examples. The separation or segmentation of functionality as discussed herein is presented for illustrative purposes only.

In step 603, the computing environment 103 can receive user interface data having alert criteria 151. For instance, the computing environment 103 can provide an administrator console comprising one or more user interfaces having fields for customizing alert criteria 151, or defining actions 148.

In some examples, the computing environment 103 can generate an alert 145 and an action 148 to perform, for instance, based on the alert criteria 151 received from, for example, the administrator console or other suitable user interface. In some examples, an alert 145 includes a data structure that comprises one or more identifiers that uniquely identify individual ones of the edge devices 112. As such, edge devices 114 having a unique identifier defined in an alert 145 will receive the alert 145 through the message broker 224 or other suitable service. The actions 148 can include tasks to be performed on the edge device 114, tasks to be performed on a sensor device 112, or other suitable tasks. In some examples, the actions 148 are remedial actions, such as those that return a sensor device 112 to a normal operational state. As shown in FIG. 6, in some examples, the alert 145 and the action 148 are generated in response to a specification of the alert criteria 141 and the action 148 made predefined in at least one user interface of an administrator console.

In step 609, the computing environment 103 can identify edge devices 112 corresponding to the alert criteria 151 received. For instance, assume a user creates an alert criteria 151 to monitor sensor devices 112 manufactured prior to year 2020 to ensure the sensor devices 112 continue to be operational. The computing environment 103 can identify all sensors devices 112 manufacturer prior to 2020, and further identify the edge devices 114 that collect metrics and other data from the sensor devices 112. Accordingly, in some examples, the computing environment 103 can query the data store 142 to identify applicable sensor devices 112 and edge devices 114.

In step 612, the computing environment 103 can determine whether the alert criteria 151 is edge allowable. In other words, the computing environment 103 can determine whether an edge device 114 is capable of processing alerts 145 based on the alert criteria 151 created. If the alert 145 analysis utilizes machine learning routines or advanced statistical routines, the computing environment 103 can determine that the alert criteria 151 should be registered on a server 124 as opposed to an edge device 114. In another example, the computing environment 103 can determine whether the alert criteria 151 needs to utilize data collected from multiple edge devices 114, which is not ideal to performed in a single edge device 114 and is instead better handled at a server 124. If the computing environment 103 determines that the alert criteria 151 is not edge allowable, the process can proceed to step 615.

In step 615, if the alert criteria 151 has been determinized to not be edge allowable, the computing environment 103 can assign evaluation of data points and analysis of the alert 145 to a server computing device 124. Thereafter, the process can proceed to completion. Referring back to step 612, if the computing environment 103 determines that the alert criteria 151 is edge allowable, the process can proceed to step 618.

In step 618, the computing environment 103 can determine whether an edge device 114 associated with the alert criteria 151 is capable of evaluating data points, analyzing the alert 145 and/or performing the action 148. In some examples, the computing environment 103 can determine whether the edge device 114 can evaluate data points, analyzing the alert 145 and/or perform the action 148 based on a computing capability of the edge device 114. The computing capability of the edge device 114 can include a device type, a central processing unit capability, a memory capability, an available computing capacity capability, or a software capability. To determine computing capabilities of an edge device 114, the computing environment 103 can analyze hardware specifications, software specifications, or other specifications of the edge device 114.

In further examples, the computing environment 103 can utilize a device profile corresponding to each of the edge devices 114 to determine whether the edge device 114 is capable of evaluating data points, analyzing the alert 145 and/or performing the action 148. For instance, the device profile can include an extensible markup language (XML) file or similar data file having hardware specifications, software specifications, settings, software and driver versions, current configurations, and other information pertaining to the edge devices 114 beneficial in determining whether an edge device 114 is capable of evaluating data points, analyzing alerts 145 and performing actions 148 locally or, in other words, without use of resources of the computing environment 103. In some examples, the device profile describes a current state of the edge device 114, and can include current configurations, settings, applications installed thereon, and other information.

In some examples, if it is determined that an edge device 114 has sufficient computing resources, but lacks requisite software, the computing environment 103 can direct an installation of an agent application 169 on the edge device 114, where the agent application 169 is configured to evaluate the data collected from at least one of the sensor devices 112 to determine whether the alert criteria 151 associated with the alert 145 is satisfied and, if so, perform one or more actions 148.

Referring back to the example shown in FIG. 5, a first type of edge device 114*a* and a second type of edge device 114*b* are shown. The first type of edge device 114*a* includes alert and action services indicating that the first type of edge device 114*a* is capable of processing alert criteria 151, whereas the second type of edge device 114*b* does not include any alert and action services, or similar applications thereon. As the second type of edge device 114*b* does not have the requisite applications to process alert criteria 151 or perform actions 148, it is understood that the second first type of edge device 114*b* is not capable of processing alert criteria 151. For example, the second type of edge device 114*b* can have insufficient central processing unit resources, RAM or hard disk resources, the ability to install the alert and actions services on the edge device 114*b*, an incompatibility of the alert and action services on the edge device 114*b*, or other incompatibility.

Referring again to FIG. 6, if the computing environment 103 determines that the edge device 114 is not capable of processing alert criteria 151 or actions 148, the process can revert to step 615. In step 615, the computing environment 103 can assign evaluation of data points, analysis of the alert 145 and performance of the action 148 to a server 124. Thereafter, the process can proceed to completion.

Referring back to step 618, if the computing environment 103 determines that the edge device 114 is capable of processing alert criteria 151 or actions 148, the process can proceed to step 621. In step 621, the computing environment 103 can assign evaluation of data points, analysis of the alert 145, and the performance of action 148 to the edge device 114. It is understood that an alert criteria 151 can be applicable to more than one edge device 114. As such, in some examples, the computing environment 103 can register the alert criteria 151 to the edge devices 114 capable of processing the alert criteria 151 and the action 148 and, for a second portion of the edge devices 114 not capable of processing the alert criteria 151 and the action 148, register the alert criteria 151 to the server 124, such as described in step 615. Thereafter, the process can proceed to completion.

Figure 7:
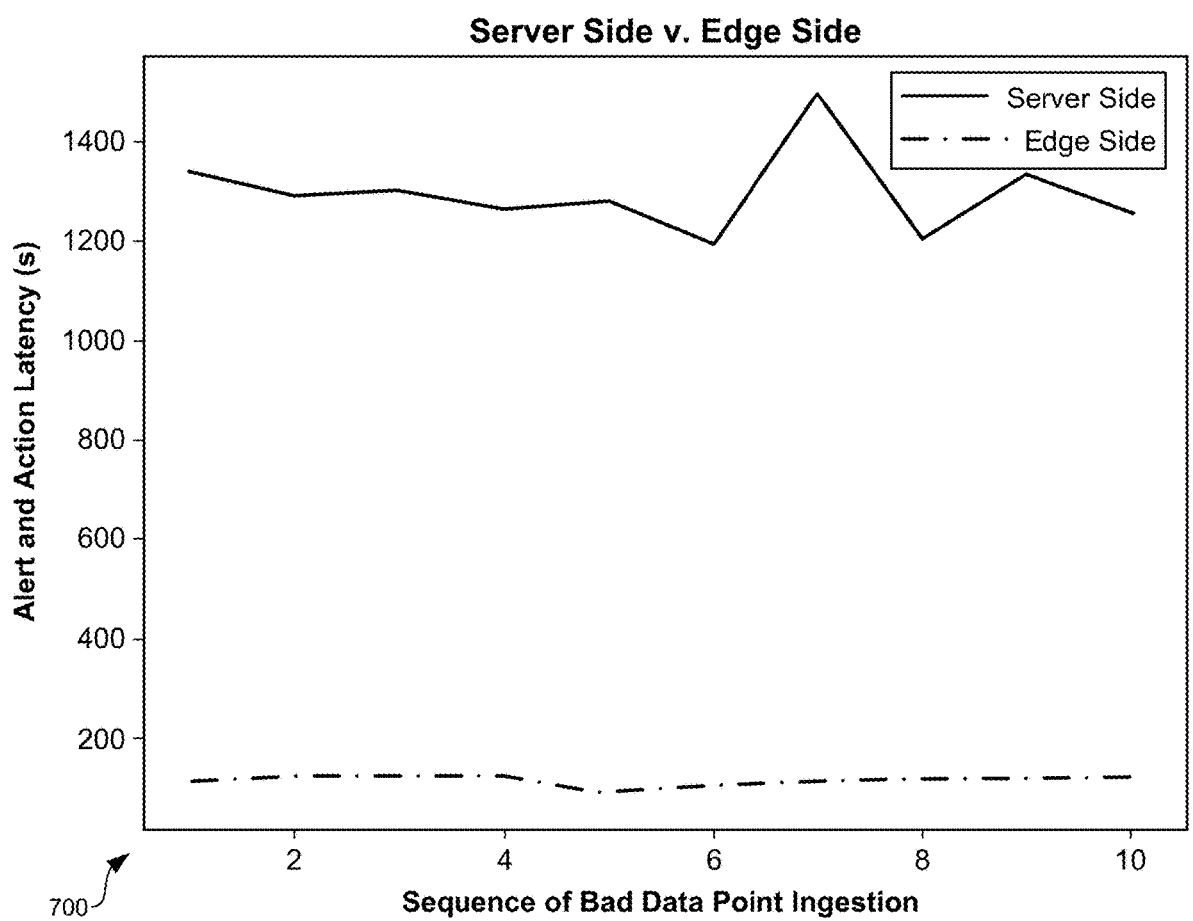
FIGS. 7 and 8 are charts illustrating experimental results for hybrid alert and action evaluation as described herein.
Figure 8:
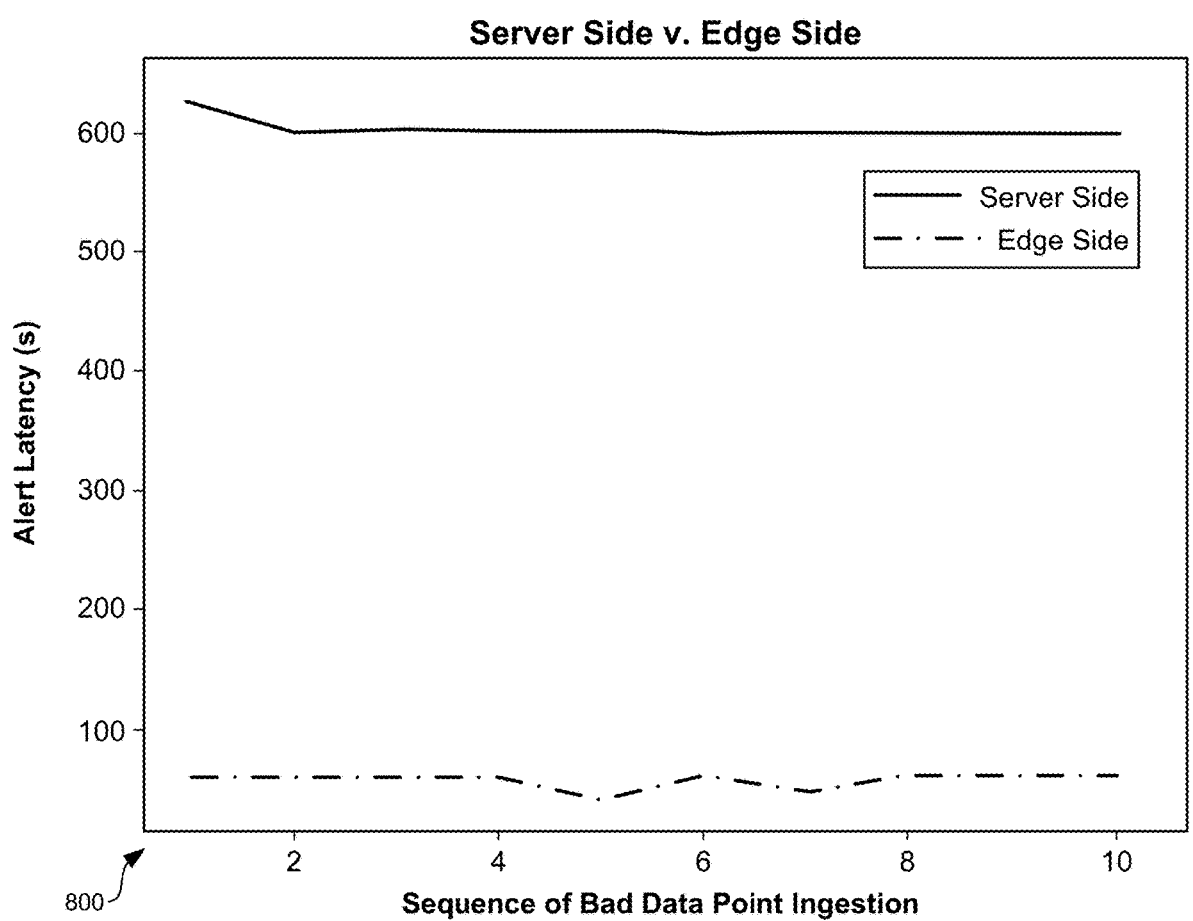

Turning now to FIGS. 7 and 8, a chart 700 and a chart 800 are shown, respectively, depicting result of various experiments performed in accordance with the examples described herein. An alert and action latency (AAL) can be defined as the time interval from when a bad data point is sent by the agent application 169 to when the sensor device 112 is returned to a normal operational state by performing an action 148. The solutions described herein aim to satisfy demand for the low alert and action latency. Therefore, it is beneficial to evaluate data received from sensor devices 112 and perform actions 148 locally on the edge device 114 rather than on the server 124 when the edge device 114 is powerful enough to do so. In the edge-side alert and action solution, described with respect to FIG. 4, all the involved procedures in alert and action latency occur on the edge device 114, whereas, in the server-side solution described with respect to FIG. 3, all of the procedures in alert and action latency occur not only on the server 124, but also have one remote round trip between the agent application 169 and the server 124.

To prove that the hybrid solution described herein outperforms traditional server side architecture, the alert and action latency of the edge-side alert and action solution shown and described with respect to FIG. 4 is compared with that of the server-side solution shown and described with respect to FIG. 3.

In the experiments, Kapacitor was employed as the data process and evaluation service 209, influxDB as the time-series database 216, MongoDb as the metadata database 212, MQTT as the message broker 224, Envoy as the reverse proxy 200. Additionally, action decision making was performed as an alert 145 to operations mapping. For example, an alert criteria 151 was registered to set up a threshold based lambda on the metric of "CPU utilization" for certain type of sensor devices 112, that is, "CPU">90.0. In other words, when the CPU utilization of a sensor device 112 is high, an 145 alert is triggered. An action 148 mapped to this alert 145 can include executing a secure shell (SSH) command on the sensor device 112 to kill a certain process.

Two sets of experiments were performed with the server-side alert and action service of FIG. 3, or with the edge-side service of FIG. 4. The implementation of the server-side alert and action service, Case A, has followed the example architecture shown in FIG. 3, while the edge-side solution, Case B, has followed the example architecture shown in FIG. 4. The edge system resource capacity in tests included: two CPU cores, 8G memory, and 16G hard disks.

There are two steps involved in each of the experiments. First, an alert definition is created by initiating an HTTP request. Second, bad data points are ingested to trigger alerts 145, then an action 148 will be automatically decided and sent to the agent application 169 of the edge device 114 to convey to corresponding sensor devices 112. For case A, the HTTP request was sent to Envoy, and bad data points were then directed to Envoy. For case B, the HTTP request will still be sent to Envoy, but the alert definition sub-service 206 will redirect the request to the edge-side Kapacitor, whereas bad data points will be directly sent to Kapacitor by the agent application 169.

In addition to alert and action latency, alert latency (AL) is defined as the time interval from when a bad data point is sent out by an agent application 169 to when an alert 145 is triggered. It is apparent in FIGS. 7 and 8 that alert and action latency in the edge-side solution is only around 10% of that of the server-side solution, and that alert latency in the edge-side solution is less than 10% of that of the server-side solution. The hybrid solutions described herein take advantage of local edge computing, that is, alerts 145 and data point evaluation will be done locally and quickly on the edge devices 114, and will not be sent to a remotely located server 124 for evaluation, which adds at least a two round trip delay between the edge device 114 and the server 124. This in turn improves the alert and action service performance, and greatly reduced alert and action latency, and alert latency.

Two disadvantages of evaluating data points and making decision for actions 148 on the server 124 include high and unpredictable latency and a demand for network bandwidth. Therefore, it is understood that evaluating data points and making decisions for actions 148 can be performed on an edge device 114. However, this may not be possible when the edge device 114 has poor computing capabilities and cannot support data point evaluation, alert 145 analysis and action 148 execution, or when the data evaluation criteria or alert 145 analysis are complicated. Therefore, a hybrid alert and action service is described which extends the traditional server-side alert and action architecture to include the edge-side data point evaluation, alert analysis, and action decision maker components. The solution is flexible, satisfying requirements of lower latency in generating alerts 145 and performing actions 148 quickly by employing edge-side data point evaluation, alert analysis, and action decision making components.

Stored in the memory device are both data and several components that are executable by the processor. Also stored in the memory can be a data store 142 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 106 can be used to access user interfaces generated to configure or otherwise interact with the computing environment 103. These client devices 106 can include a display upon which a user interface generated by a client application for providing a virtual desktop session (or other session) can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
  at least one server computing device; and
  program instructions stored in memory and executable in the at least one server computing device that, when executed by the at least one server computing device, direct the at least one server computing device to:
    generate an alert and an action to perform when criteria associated with the alert is satisfied based at least in part on data collected from at least one of a plurality of sensor devices;
    determine whether the alert and the action is capable of being evaluated and performed on individual ones of a plurality of edge computing devices in communication with the at least one of the sensor devices based at least in part on a computing capability of the individual ones of the edge computing devices, or the at least one server computing device;
    for a first portion of the edge computing devices capable of evaluating and performing the alert and the action, assign the alert and the action for the first portion to the first portion of the edge computing devices; and
    for a second portion of the edge computing devices not capable of evaluating and performing the alert and the action, assign the alert and the action for the second portion to the at least one server computing device.

2. The system of claim 1, wherein the at least one server computing device is further directed to:
  prior to sending the alert and the action to the first portion of the edge computing devices, direct an installation of an agent application on the individual ones of the edge computing devices in the first portion, the agent application being configured to evaluate the data collected from at least one of the sensor devices to determine whether the criteria associated with the alert is satisfied and perform the action.

3. The system of claim 1, wherein the computing capability of a respective one of the edge computing devices is indicates that an agent application installed in the respective one of the edge computing devices is configured to evaluate the alert based on the data received from the sensor devices and perform the action.

4. The system of claim 1, wherein the computing capability of a respective one of the edge computing devices is at least one of: a device type, a central processing unit (CPU) capability, a memory capability, an available computing capacity capability, and a software capability.

5. The system of claim 1, wherein a determination of the alert and the action being evaluated and performed on the edge computing devices or the at least one server computing device is determined in response to a specification of the criteria and action options made in at least one user interface of an administrator console.

6. The system of claim 1, wherein the at least one server computing device is further directed to:
identify the first portion of the edge computing devices from a database of edge computing device based at least in part on criteria defined by an administrator through an administrator user interface.

7. The system of claim 1, wherein the at least one server computing device is further directed to:
identify that an analysis of the alert requires at least one of a machine learning routine and an advanced statistical routine, the action and the alert being assigned to the first portion of the edge computing devices or the at least one server computing device based at least in part the analysis of the alert requiring at least one of the machine learning routine and the advanced statistical routine.

8. The system of claim 1, wherein the at least one server computing device is further directed to:
access a device profile for the individual ones of the edge computing devices comprising at least one of: a hardware specification, a software specification, a setting, a software version, a driver version, and a current configuration of a respective one of the edge computing devices; and
identify the computing capability of the individual ones of the edge computing devices from the device profile.

9. A method, comprising:
generating an alert and an action to perform when criteria associated with the alert is satisfied based at least in part on data collected from at least one of a plurality of sensor devices;
determining whether the alert and the action is capable of being evaluated and performed on individual ones of a plurality of edge computing devices in communication with the at least one of the sensor devices based at least in part on a computing capability of the individual ones of the edge computing devices, or at least one server computing device;
for a first portion of the edge computing devices capable of evaluating and performing the alert and the action, assigning the alert and the action associated with the first portion to the first portion of the edge computing devices; and
for a second portion of the edge computing devices not capable of evaluating and performing the alert and the action, assigning the alert and the action associated with the second portion to the at least one server computing device.

10. The method of claim 9, further comprising:
prior to sending the alert and the action to the first portion of the edge computing devices, directing an installation of an agent application on the individual ones of the edge computing devices in the first portion, the agent application being configured to evaluate the data collected from at least one of the sensor devices to determine whether the criteria associated with the alert is satisfied and perform the action.

11. The method of claim 9, wherein the computing capability of a respective one of the edge computing devices is indicates that an agent application installed in the respective one of the edge computing devices is configured to evaluate the alert based on the data received from the plurality of sensor devices and perform the action.

12. The method of claim 9, wherein the computing capability of a respective one of the edge computing devices is at least one of: a device type, a central processing unit (CPU) capability, a memory capability, an available computing capacity capability, and a software capability.

13. The method of claim 9, wherein a determination of the alert and the action being evaluated and performed on the edge computing devices or the at least one server computing device is determined in response to a specification of the criteria and action options made in at least one user interface of an administrator console.

14. The method of claim 9, further comprising:
identifying that an analysis of the alert requires at least one of a machine learning routine and an advanced statistical routine, the action and the alert being assigned to the first portion of the edge computing devices or the at least one server computing device based at least in part the analysis of the alert requiring at least one of the machine learning routine and the advanced statistical routine.

15. The method of claim 9, further comprising:
accessing a device profile for the individual ones of the edge computing devices comprising at least one of: a hardware specification, a software specification, a setting, a software version, a driver version, and a current configuration of a respective one of the edge computing devices; and
identifying the computing capability of the individual ones of the edge computing devices from the device profile.

16. A non-transitory computer-readable medium comprising program instructions that, when executed by at least one server computing device, direct the at least one server computing device to:
generate an alert and an action to perform when criteria associated with the alert is satisfied based at least in part on data collected from at least one of a plurality of sensor devices;
determine whether the alert and the action is capable of being evaluated and performed on individual ones of a plurality of edge computing devices in communication with the at least one of the sensor devices based at least in part on a computing capability of the individual ones of the edge computing devices, or the at least one server computing device;
for a first portion of the edge computing devices capable of evaluating and performing the alert and the action, assign the alert and the action for the first portion to the first portion of the edge computing devices; and
for a second portion of the edge computing devices not capable of evaluating and performing the alert and the action, assign the alert and the action for the second portion to the at least one server computing device.

17. The non-transitory computer-readable medium of claim 16, wherein the at least one server computing device is further directed to:

prior to sending the alert and the action to the first portion of the edge computing devices, direct an installation of an agent application on the individual ones of the edge computing devices in the first portion, the agent application being configured to evaluate the data collected from at least one of the sensor devices to determine whether the criteria associated with the alert is satisfied and perform the action.

18. The non-transitory computer-readable medium of claim 16, wherein the computing capability of a respective one of the edge computing devices indicates that is an agent application installed in the respective one of the edge computing devices is configured to evaluate the alert based on the data received from the plurality of sensor devices and perform the action.

19. The non-transitory computer-readable medium of claim 16, wherein a determination of the alert and the action being evaluated and performed on the edge computing devices or the at least one server computing device is determined in response to a specification of the criteria and action options made in at least one user interface of an administrator console.

20. The non-transitory computer-readable medium of claim 16, wherein the computing capability of a respective one of the edge computing devices is at least one of: a device type, a central processing unit (CPU) capability, a memory capability, an available computing capacity capability, and a software capability.

* * * * *